United States Patent [19]
Poister

[11] Patent Number: 6,125,738
[45] Date of Patent: Oct. 3, 2000

[54] COOKING DEVICE FOR SEPARATING AND RETAINING FAT FROM FOODS DURING COOKING

[76] Inventor: Clarence E. Poister, 1838 S. Laurel St., Wichita, Kans. 67207-5818

[21] Appl. No.: 09/417,275

[22] Filed: Oct. 13, 1999

[51] Int. Cl.[7] .............................. A47J 27/00; A47J 27/04; A47J 37/00
[52] U.S. Cl. ................................. 99/339; 99/340; 99/413; 99/417; 99/446; 99/448; 99/450; 126/369; 219/401
[58] Field of Search .............................. 99/330, 339, 340, 99/403, 410–418, 444–450, 400, 401; 126/369, 369.1, 20, 390; 219/401; 220/912, 428; 210/464–469, 475, 477; 426/523, 510, 511

[56] References Cited

U.S. PATENT DOCUMENTS

| | | |
|---|---|---|
| 1,263,004 | 4/1918 | Tollagsen . |
| 1,740,205 | 12/1929 | Schmidt . |
| 3,055,287 | 9/1962 | Henry . |
| 3,311,048 | 3/1967 | Pickering . |
| 3,908,111 | 9/1975 | Du Bois et al. .................. 219/442 |
| 4,148,250 | 4/1979 | Miki et al. ........................ 99/403 |
| 4,426,923 | 1/1984 | Ohata ............................... 99/468 |
| 4,509,412 | 4/1985 | Whittenburg et al. . |
| 4,580,549 | 4/1986 | Sato . |
| 4,672,179 | 6/1987 | Onishi et al. .................... 99/403 X |
| 4,739,698 | 4/1988 | Allaire ............................. 99/410 |
| 4,982,656 | 1/1991 | Stone .............................. 99/450 X |
| 5,092,229 | 3/1992 | Chen ............................... 99/413 X |
| 5,097,753 | 3/1992 | Naft . |
| 5,189,947 | 3/1993 | Yim ................................. 99/415 |
| 5,216,947 | 6/1993 | Cheng ............................. 99/448 X |
| 5,275,094 | 1/1994 | Naft . |
| 5,400,701 | 3/1995 | Sham .............................. 99/410 |
| 5,404,803 | 4/1995 | Glucksman ..................... 99/473 |
| 5,421,254 | 6/1995 | McDonald . |
| 5,458,050 | 10/1995 | Su ................................... 99/340 |
| 5,584,235 | 12/1996 | DuBois et al. ................. 99/413 |
| 5,826,494 | 10/1998 | Wang . |

FOREIGN PATENT DOCUMENTS 15370   7/1895   United Kingdom .

Primary Examiner—Timothy Simone
Attorney, Agent, or Firm—Jeffrey L. Thompson; Thompson & Thompson, P.A.

[57] ABSTRACT

An improved cooking device includes a generally bowl-shaped fat separator assembly adapted to be placed substantially within a cooking chamber of a crock pot and supported by an upper rim of the crock pot. The fat separator assembly has a fat collection chamber with an adjustable overflow passage for maintaining a predetermined fluid level within the fat collection chamber. A lower cooking plate is supported by the fat separator assembly and has a support surface positioned above the predetermined fluid level for supporting food during cooking. A sidewall extension member has a lower edge supported on the upper rim of the crock pot. A removable cover is supported on an upper end of the sidewall extension member. An upper cooking plate is supported by the sidewall extension member above the lower cooking plate. The upper cooking plate permits fluids to pass therethrough and fall onto the lower cooking plate during cooking. The cooking conditions provided on the lower cooking plate are particularly suitable for cooking meats, while the conditions provided on the upper cooking plate are particularly suitable for cooking vegetables. As foods are being cooked, fats accumulate within the fat collection chamber, and other fluids, such as water and broth, are returned to the bottom of the crock pot through the adjustable overflow passage.

20 Claims, 3 Drawing Sheets

COOKING DEVICE FOR SEPARATING AND RETAINING FAT FROM FOODS DURING COOKING

BACKGROUND OF THE INVENTION

1. Field of the Invention

The present invention relates generally to cooking devices. In particular, the present invention relates to cooking devices that can be used to separate and remove fat from foods cooked in a crock pot and the like.

2. Description of the Related Art

For many years, doctors and researchers in medicine, professionals in cooking, therapists for fitness and well-being, and vocal persons and writers in the media have directed attention to excessive consumption of fat. Cholesterol contained in fat, particularly animal fat, contributes to vascular disease. Moreover, excessive consumption of fat increases body weight and often leads to obesity.

Beef fat typically contains more undesirable cholesterol than fish, pork or poultry. Some people have purchased less beef in an attempt to consume less cholesterol, a marketing trend that has been a detriment to the beef industry.

There has been little technology developed for separating good fat from bad fat during cooking. Doctors encourage patients to eat less fat to avoid too much cholesterol. Meat processors add poultry meat to beef to reduce cholesterol, then claim reduced "fat" content in the final product. However, to effectively reduce bad fat in beef consumption, both the good fat and the bad fat should be removed during processing and cooking. The bad fat can then be extracted by mechanical means (e.g., centrifugal or filtration) or a refinery process (e.g., chemicals and heat) to separate bad fat from the good.

A crockpot is a popular piece of cookware that provides slow cooking of foods using water and steam. Water is heated on the bottom of the crockpot, steam from the heated water cooks ingredients as it rises to the lid, then condenses into droplets that baste foods as they fall back to the bottom of the crockpot. This cycle of steam generation continues until cooking of the food is completed.

The use of steam cooking devices has grown in popularity in recent years due to a perception that foods cooked in steamers tend to maintain their nutrients and have less added fat as compared to fried foods and the like. However, there is a need in the cooking industry for improved cooking devices that separate fat from foods being slowcooked in a crockpot or the like using water and steam.

SUMMARY OF THE INVENTION

It is an object of the present invention to provide an improved cooking device that solves the problems with the conventional cooking devices described above.

More specifically, the principal objects of the present invention are to provide a cooking device that: separates fat from other fluids, such as water and broth, during cooking in a crock pot and the like; permits the separated fat to be removed and disposed of separately from the cooked foods; provides multiple cooking areas having different heating and steaming conditions for cooking different types of food, such as meat and vegetables; allows easy adjustment of the amount of fat to be separated and removed from the food using an adjustable overflow tube; has separable components that nest together for compact and efficient transport and storage; facilitates easy use and cleanup; and can be used with conventional cooking ware, such as crock pots and the like.

It is a further object to provide a cooking device that is economical to manufacture, efficient in use, capable of a long operating life, and particularly well suited for separating fat from foods during cooking.

In order to realize the objects and advantages set forth above, the Applicant has developed an improved cooking device that comprises a generally bowl-shaped fat separator assembly adapted to be placed substantially within a cooking chamber of a crock pot and supported by an upper rim of the crock pot. The fat separator assembly has a fat collection chamber with an adjustable overflow passage for maintaining a predetermined fluid level within the fat collection chamber. A lower cooking plate is supported by the fat separator assembly and has a support surface positioned above the predetermined fluid level for supporting food during cooking.

The cooking device further comprises an upper cooking plate supported above the lower cooking plate by a sidewall extension member extending above the upper rim of the crock pot. A removable cover rests on an upper end of the sidewall extension member to form a closed cooking chamber and to distribute condensed water droplets back over the food during cooking. The upper cooking plate permits condensate and other fluids to pass therethrough and fall onto the lower cooking plate. The cooking conditions provided on the lower cooking plate are particularly suitable for cooking meats, while the cooking conditions provided on the upper cooking plate are particularly suitable for cooking vegetables. As foods are being cooked, fats accumulate within the fat collection chamber, and other fluids, such as water and broth, are returned to the bottom of the crock pot through the adjustable overflow passage.

According to a broad aspect of the present invention, a cooking device is provided, comprising: a fat separator member having a generally circular bottom surface and generally cylindrical sidewalls extending upwardly from the bottom surface, the bottom surface having an opening extending therethrough; a first cooking plate positioned within the fat separator member and having a support surface spaced above the bottom surface of the fat separator member for supporting food during cooking; an adjustable overflow tube positioned snugly through the opening and extending upwardly from the bottom surface, the tube being vertically slidable through the opening to adjust a vertical position of an upper edge of the tube between the bottom surface of the fat separator member and the support surface of the first cooking plate, whereby a fluid level is maintained within the fat separator member between the bottom surface and the support surface. A removable stopper adapted to fit snugly into an upper end of the overflow tube is provided to facilitate removal of the fat separator member from the crock pot without spilling fluid through the tube.

According to another broad aspect of the present invention, a cooking device is provided with a fat separator member having a generally bowl-shaped fat collection chamber with a bottom surface and upstanding sidewalls, and an overflow passage extending through the fat separator member. The overflow passage has an inlet within the fat collection chamber spaced above the bottom surface to maintain a fluid level within the fat collection chamber above the bottom surface. A first cooking plate is positioned within the fat separator member and has a support surface spaced above the bottom surface of the fat separator member for supporting food above a fluid level within the fat collection chamber during cooking. A second cooking plate is positioned above the first cooking plate. The second cooking plate has a second support surface for supporting food during cooking and openings for allowing fluids to pass therethrough and fall onto the first cooking plate. A cover is supported above the second cooking plate to form a generally closed cooking chamber containing the first and second cooking plates.

The cooking device further includes a generally cylindrical sidewall extension member having a lower end adapted to rest on an upper rim of a crock pot, an upper end supporting the cover, and a first means between the upper and lower ends for supporting the second cooking plate in a first position above the first cooking plate. The sidewall extension member also has a second means for supporting the second cooking plate in a second position above the first cooking plate, the second position being spaced below the first position. An insulator material surrounds an outer surface of the sidewall extension member.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

Figure 1:
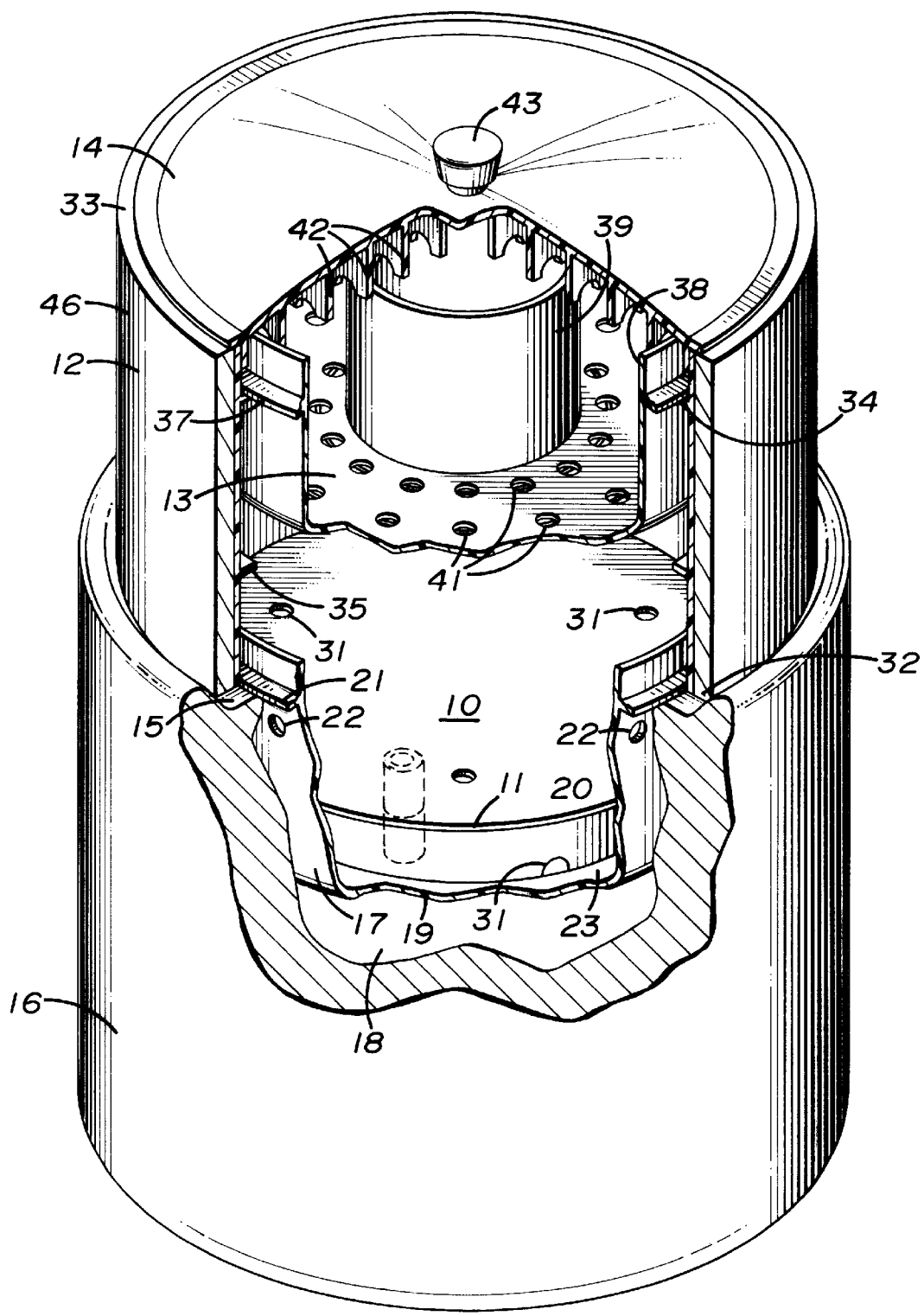
FIG. 1 is a partially cutaway perspective view of a cooking device according to the present invention.
Figure 2:
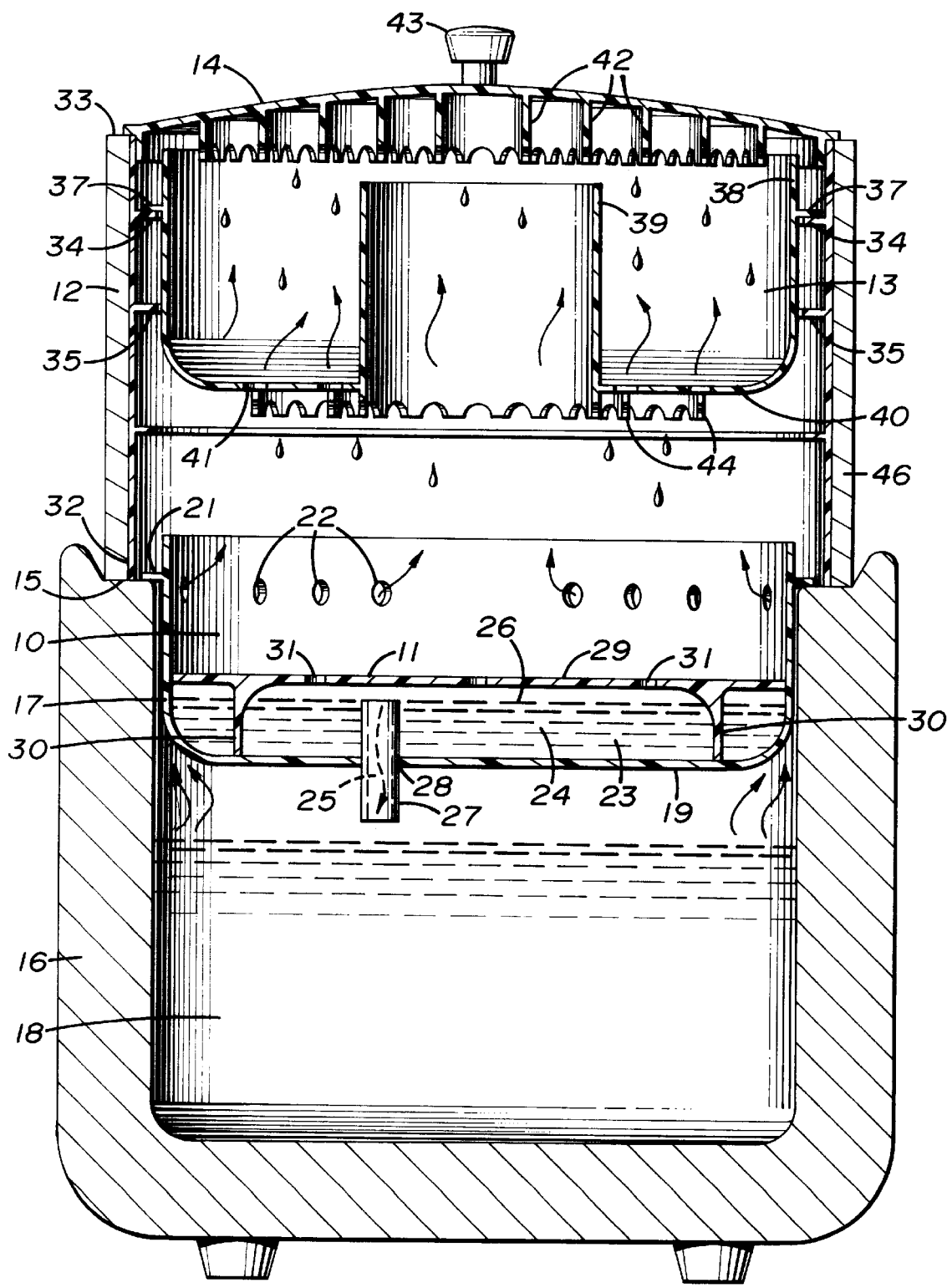
FIG. 2 is a sectional front view of the cooking device shown in FIG. 1.
Figure 3:
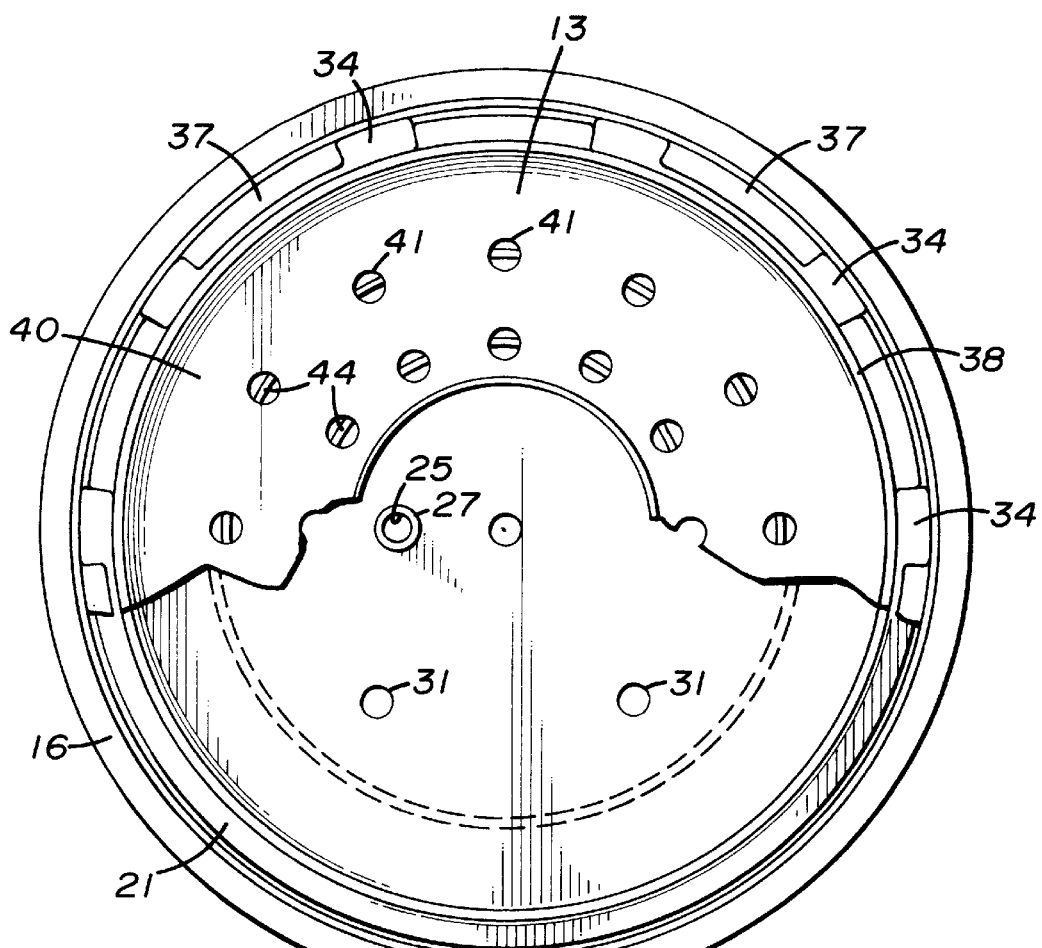
FIG. 3 is a partially cutaway plan view of the cooking device shown in FIG. 1.

A cooking device for separating and removing fat from foods according to a preferred embodiment of the present invention will now be described in detail by reference to FIGS. 1 to 4 of the accompanying drawings.

The cooking device according to the present invention includes a fat separator 10, a lower cooking plate 11, a sidewall extension member 12, an upper cooking plate 13, and a cover 14. These components are arranged in the manner shown in FIGS. 1 and 2 of the drawings to rest on an upper rim 15 of a conventional crockpot 16.

The fat separator 10 comprises a generally bowl-shaped member 17 adapted to be placed substantially within the cooking chamber 18 of the crock pot 16. The bowl-shaped member 17 has a bottom surface 19 surrounded by an upstanding cylindrical wall 20. The bowl-shaped member 17 has a flange 21 surrounding an outer periphery of the cylindrical wall 20 near an upper end for resting on the upper rim 15 of the crockpot 16. A plurality of holes 22 are provided through the cylindrical wall 20 below the flange 21 to permit steam and heat to circulate through from the lower cooking chamber 18 of the crockpot 16.

The bowl-shaped member 17 defines a fat collection chamber 23 in which fat and other fluids 24 accumulate during cooking. An adjustable overflow passage 25 is provided for maintaining a predetermined fluid level 26 within the fat collection chamber 23. The overflow passage 25 includes a tube 27 positioned snugly through an opening 28 in the bottom surface 19 of the bowl-shaped member 17. The tube 27 extends upwardly from the bottom surface 19 and is vertically slidable through the opening 28 to adjust a vertical position of an upper edge of the tube 27. The upper edge of the tube 27 extends to a position between the bottom surface 19 of the bowl-shaped member 17 and a support surface 29 of the lower cooking plate 11. Thus, the tube 27 operates to maintain a fluid level 26 within the fat collection chamber 23 between the bottom surface 19 of the chamber 23 and the support surface 29 of the lower cooking plate 11.

The lower cooking plate 11 is supported by the fat separator assembly 10. The support surface 29 of the lower cooking plate 11 is positioned above the fluid level 26 in the fat collection chamber 23 for supporting food during cooking. The lower cooking plate 11 in the illustrated embodiment has a support structure 30 for engaging the bottom surface 19 of the bowl-shaped member 17 and supporting the support surface 29 in the desired position. A plurality of holes 31 are provided through the support surface 29 and the support structure 30 to permit fluids to pass freely therethrough into the fat collection chamber 23. The lower cooking plate 11 and the bowl-shaped member 17 are formed as separate components in the illustrated embodiment for ease of manufacturing and to facilitate thorough cleaning of parts. However, the lower cooking plate 11 could also be formed integrally with the bowl-shaped member 17.

The sidewall extension member 12 is a generally cylindrical member that has a lower edge 32 supported on the upper rim 15 of the crock pot 16. The removable cover 14 is supported on an upper end 33 of the sidewall extension member 12 to form a generally closed cooking chamber containing the upper and lower cooking plates 11, 13.

A plurality of inwardly projecting ledges 34, 35 are formed around the periphery of an inside wall 36 of the extension member 12 for supporting the upper cooking plate 13 at a selected vertical position. A first group of the ledges 34 are positioned at a first vertical height, and a second group of the ledges 35 are positioned at a second vertical height. A plurality of outwardly projecting flanges 37 are provided on an outside surface of the upper cooking plate 13 at locations that correspond with the ledges 34, 35 on the extension member 12. The upper cooking plate 13 is supported at the selected vertical position by engaging the flanges 37 of the upper cooking plate 13 with the ledges 34, 35 of the sidewall extension member 12.

The upper cooking plate 13 has an outer cylindrical wall 38 and an inner cylindrical wall 39 which are generally concentric with each other. A bottom support surface 40 for supporting food within the upper cooking plate 13 extends between the lower ends of the outer and inner walls 38, 39. A plurality of holes 41 are provided through the bottom surface 40 of the upper cooking plate 13 through which steam and fluids can circulate during cooking. The open center defined by the inner cylindrical wall 39 allows condensation on the cover 14 above the upper cooking plate 13 to fall directly onto food being cooked on the lower cooking plate 11.

The cover 14 is thin and cooler than steam generated in the crockpot 16. The steam cooks ingredients and maintains cooking temperatures as it rises. The cover 14 cools the steam and causes it to condense into water droplets. The cover 14 has a plurality of concentric distributor rings 42 positioned across a bottom surface of the cover 14 for distributing the condensed water droplets evenly over food being cooked on the upper cooking plate 13, as well as food being cooked on the lower cooking plate 11. The distributor rings 42 have grooved or serrated edges to facilitate uniform distribution of condensed water droplets, even when the crockpot 16 is not placed on a level surface. The cover 14 also has an insulated handle or grip 43 for easy handling and removal when hot.

The upper cooking plate 13 also has a plurality of concentric distributor rings 44 positioned across a bottom side for distributing condensate and other fluids evenly over food being cooked on the lower cooking plate 11. The distributor rings 44 on the bottom surface of the upper cooking plate 13 can be similar in structure to the distributor rings 42 formed on the cover 14.

Although the upper cooking plate 13 and the sidewall extension member 12 are illustrated as two separate components, they can be combined into a single integral piece to reduce assembly time and make the device somewhat easier to use. A second upper cooking plate (not shown) supported by the sidewall extension member 12 or a second extension member positioned above the sidewall extension member 12 can be used to provide more cooking space. In this case, the amount of heat, water and steam generated will need to be increased accordingly to provide adequate cooking capacity for the increased cooking space.

Figure 4:
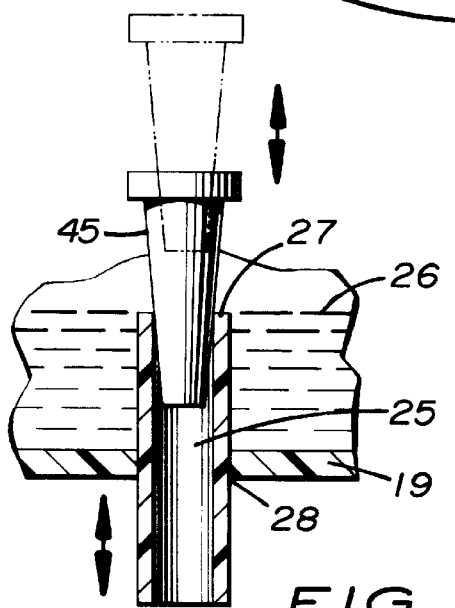
FIG. 4 is an enlarged sectional view of an adjustable overflow tube and stopper used in the cooking device.

As shown in FIG. 4, a tapered stopper member 45 is provided for plugging the overflow passage 25 in the tube 27 before removing the fat separator 10 from the crockpot 16. The tapered stopper member 45 prevents the fluid contained within the fat collection chamber 23 from spilling out of the overflow tube 27 as the fat separator 10 is moved to a sink, a waste basket, a collection barrel, or the like to empty the fat contained within the fat collection chamber 23.

An insulator material 46 is provided around the sidewall extension member 12 to minimize heat loss from the cooking chamber during cooking. The insulator material 46 can be a quilted cloth similar to that employed for heat pads used around kitchens, a double-walled plastic material containing insulating air space, cardboard, or other suitable insulator material.

The cooking conditions provided on the lower cooking plate 11 are particularly suitable for cooking meats, while the conditions provided on the upper cooking plate 13 are particularly suitable for cooking vegetables. It is noted that most crockpot cooking instructions state that vegetables should be placed on the bottom of the cooking chamber with meat over the vegetables because vegetables generally take longer to cook than meat. However, the vegetables will tend to absorb fat from the meat when cooked in this manner. The cooking device of the present invention places the vegetables above the meat where they are free from fats and oils. The positioning of the vegetables in this manner provides substantial healthful benefits by reducing fat consumption.

As foods are being cooked with the cooking device of the present invention, steam is released from the fluids being heated at the bottom of the crockpot 16. The steam circulates upwardly through the holes 22 in the fat separator 10 and the holes 41 in the upper cooking plate 13 until it reaches the bottom surface of the cover 14. The steam then condenses on the cover 14 and forms water droplets that are distributed across the cover 14 by the distributor rings 42. The water droplets then fall onto the foods, such as vegetables, being cooked on the upper cooking plate 13. The water droplets also fall through the center opening of the upper cooking plate 13 onto the foods, such as meat, being cooked on the lower cooking plate 11. Thus, the condensed water droplets falling from the cover 14 baste the foods in the upper cooking plate 13 and the foods in the center portion of the lower cooking plate 11.

The foods being cooked on the upper cooking plate 13 also release fluids during cooking that mix with the condensed water droplets and pass through the holes 41 in the bottom surface 40 of the upper cooking plate 13. These fluids are dispersed over the foods, such as meat, being cooked on the lower cooking plate 11 by the distributor rings 44 located on the bottom surface 40 of the upper cooking plate 13. The foods being cooked on the lower cooking plate 11 release fluids during cooking that mix with the other fluids and pass through the holes 31 in the lower cooking plate 11 into the fat collection chamber 23. At normal cooking temperatures, the specific gravity of liquid animal fat and other fatty liquids is such that other fluids, such as water and broth, remain on top of the fluid mixture. Thus, the fluid mixture in the fat collection chamber 23 has a layer of fat at the bottom and a layer of nonfatty liquids at the top. When the fluid level 26 in the fat collection chamber 23 rises to a predetermined level, the nonfatty liquids flow through the overflow tube 27 and return to the bottom chamber 18 of the crockpot 16 for reheating and recirculation through the cooking device. The fatty liquids remain at the bottom of the fat collection chamber 23 and are removed from the device separately after the foods on the upper and lower cooking plates 11, 13 are cooked and removed. Since fat imparts substantial flavor to foods, some loss of flavor from the broth will occur when the fat is removed by the fat separator 10 of the present invention. However, the flavor may be readily restored and accented by adding various seasonings and bouillon cubes to match the kind of food being cooked. The broth can then be used in all the usual ways for juices, sauces, gravies, and so forth.

The components illustrated in the drawings are shaped such that they can be easily nested together for easy transport and storage. The various components can be made of a variety of materials, such as metals or plastics. In a preferred embodiment, the components are made of polyethylene because of its resistance to heat, moisture, fat and oil, and because it can be easily molded and is inexpensive and widely used in microwave ovens. All of the components can be cleaned, for example, using an automatic dishwasher.

It will be appreciated that the present invention is not limited to the exact constructions that have been described above and illustrated in the accompanying drawings, and that various modifications and changes can be made without departing from the scope and spirit of the invention. It is intended that the scope of the invention be limited only by the appended claims.

What is claimed is:

1. A cooking device, comprising:
    a fat separator member having a bottom surface and sidewalls extending upwardly from said bottom surface, said bottom surface having an opening extending therethrough;
    a first cooking plate positioned within said fat separator member and having a support surface spaced above said bottom surface of said fat separator member for supporting food during cooking;
    an adjustable overflow tube positioned snugly through said opening and extending upwardly from said bottom surface, said tube being vertically slidable through said opening to adjust a vertical position of an upper edge of said tube between said bottom surface of said fat separator member and said support surface of said first cooking plate, whereby a fluid level is maintained within said fat separator member between said bottom surface and said support surface during cooking.

2. The cooking device according to claim 1, further comprising a removable stopper adapted to fit snugly into an upper end of said tube to facilitate removal of said fat separator member from a cooking chamber without spilling fluid through said tube.

3. The cooking device according to claim 1, further comprising a support structure arranged about said fat separator member for supporting said fat separator member within a crock pot.

4. The cooking device according to claim 3, wherein said support structure comprises a flange extending about an outer periphery of said fat separator member, said flange being adapted to rest on an upper rim of a crock pot.

5. The cooking device according to claim 1, further comprising a second cooking plate positioned above said first cooking plate, said second cooking plate having a second support surface for supporting food during cooking, and openings for allowing fluids to pass therethrough and fall onto said first cooking plate.

6. The cooking device according to claim 5, further comprising a generally cylindrical sidewall extension member having a lower edge adapted to rest on an upper rim of a crock pot and a first means for supporting said second cooking plate in a first position above said first cooking plate.

7. The cooking device according to claim 6, wherein said sidewall extension member further comprises a second means for supporting said second cooking plate in a second position above said first cooking plate, said second position being spaced below said first position.

8. The cooking device according to claim 6, wherein said second cooking plate comprises an outer wall and an inner wall and said second support surface extends between lower ends of said outer and inner walls.

9. The cooking device according to claim 8, wherein said second cooking plate has an open center defined by said inner wall through which condensation above said second cooking plate can fall directly onto food being cooked on said first cooking plate.

10. The cooking device according to claim 6, further comprising an insulator material surrounding an outer surface of said sidewall extension member.

11. The cooking device according to claim 5, further comprising a cover supported above said second cooking plate, said cover having means for distributing condensed water droplets over food being cooked on said first and second cooking plates.

12. A cooking device comprising:
a fat separator member having a generally bowl-shaped fat collection chamber with a bottom surface and upstanding sidewalls, and an overflow passage extending through said fat separator member, said overflow passage having an inlet within said fat collection chamber spaced above said bottom surface to maintain a fluid level within said fat collection chamber above said bottom surface;
a first cooking plate positioned within said fat separator member and having a support surface spaced above said bottom surface of said fat separator member for supporting food above a fluid level within said fat collection chamber during cooking;
a second cooking plate positioned above said first cooking plate, said second cooking plate having a second support surface for supporting food during cooking, and openings for allowing fluids to pass therethrough and fall onto said first cooking plate; and
a cover supported above said second cooking plate to form a generally closed cooking chamber containing said first and second cooking plates.

13. The cooking device according to claim 12, further comprising a generally cylindrical sidewall extension member having a lower end adapted to rest on an upper rim of a crock pot, an upper end supporting said cover, and a first means between the upper and lower ends for supporting said second cooking plate in a first position above said first cooking plate.

14. The cooking device according to claim 13, wherein said sidewall extension member further comprises a second means for supporting said second cooking plate in a second position above said first cooking plate, said second position being spaced below said first position.

15. The cooking device according to claim 13, wherein said fat separator member has a flange extending about an outer periphery thereof, said flange being adapted to rest on the upper rim of the crock pot adjacent to said lower end of said sidewall extension member.

16. The cooking device according to claim 13, further comprising an insulator material surrounding an outer surface of said sidewall extension member.

17. The cooking device according to claim 12, wherein said overflow passage comprises an adjustable overflow tube extending upwardly from said bottom surface of said fat separator member, said tube being vertically slidable to adjust a vertical position of said inlet to adjust a fluid level within said fat collection chamber.

18. The cooking device according to claim 12, wherein said second cooking plate comprises an outer cylindrical wall and an inner cylindrical wall which is concentric with said outer cylindrical wall, said second support surface extends between lower ends of said outer and inner walls, and said second cooking plate has an open center defined by said inner wall through which condensation from above said second cooking plate can fall onto food being cooked on said first cooking plate.

19. The cooking device according to claim 12, wherein said cover has distributor rings formed on a bottom surface thereof for distributing condensation over food being cooked on said first and second cooking plates.

20. A cooking assembly, comprising:
a pot having a cooking chamber and an upper rim;
a bowl-shaped fat separator assembly placed substantially within said cooking chamber and supported by said upper rim of said pot, said fat separator assembly having a fat collection chamber with an overflow passage for maintaining a predetermined fluid level within said fat collection chamber, and a first cooking plate having a first support surface positioned above said predetermined fluid level for supporting food during cooking;
a sidewall extension member having a lower edge supported on said upper rim of said pot and an upper end on which a removable cover is supported; and
a second cooking plate supported by said sidewall extension member above said first cooking plate, said second cooking plate having a second support surface for supporting food during cooking, said second cooking plate being configured to permit fluids to pass therethrough and fall onto said first cooking plate.

* * * * *